(12) United States Patent
Walker

(10) Patent No.: US 9,529,719 B2
(45) Date of Patent: Dec. 27, 2016

(54) DYNAMIC MULTITHREADED CACHE ALLOCATION

(75) Inventor: William L. Walker, Fort Collins, CO (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 766 days.

(21) Appl. No.: 13/567,066

(22) Filed: Aug. 5, 2012

(65) Prior Publication Data

US 2014/0040556 A1 Feb. 6, 2014

(51) Int. Cl.
G06F 12/00 (2006.01)
G06F 12/08 (2016.01)
G06F 9/50 (2006.01)

(52) U.S. Cl.
CPC .......... *G06F 12/084* (2013.01); *G06F 9/5016* (2013.01); *G06F 2212/6042* (2013.01)

(58) Field of Classification Search
USPC ....................................................... 711/130
See application file for complete search history.

(56) References Cited

U.S. PATENT DOCUMENTS

| | | | |
|---|---|---|---|
| 5,694,573 A * | 12/1997 | Cheong et al. | 711/122 |
| 6,725,336 B2 | 4/2004 | Cherabuddi | |
| 6,871,264 B2 | 3/2005 | Soltis, Jr. | |
| 7,457,920 B1 * | 11/2008 | Kornegay et al. | 711/133 |
| 8,087,024 B2 | 12/2011 | Lakshmanamurthy et al. | |
| 8,131,970 B2 | 3/2012 | Conte et al. | |
| 8,200,949 B1 | 6/2012 | Tarjan et al. | |
| 8,392,659 B2 | 3/2013 | Anand et al. | |
| 2002/0194433 A1 * | 12/2002 | Yamazaki | 711/136 |
| 2010/0250856 A1 * | 9/2010 | Owen | G06F 12/084 711/128 |
| 2010/0268891 A1 | 10/2010 | Conte et al. | |
| 2011/0010503 A1 * | 1/2011 | Yamamura et al. | 711/128 |
| 2011/0055838 A1 * | 3/2011 | Moyes | 718/102 |

* cited by examiner

*Primary Examiner* — Christian P Chace
*Assistant Examiner* — Hamdy S Ahmed
(74) *Attorney, Agent, or Firm* — Meyertons, Hood, Kivlin, Kowert & Goetzel, P.C.; Erik A. Heter

(57) ABSTRACT

Apparatus and method embodiments for dynamically allocating cache space in a multi-threaded execution environment are disclosed. In some embodiments, a processor includes a cache shared by each of a plurality of processor cores and/or each of a plurality of threads executing on the processor. The processor further includes a cache allocation circuit configured to dynamically allocate space in the cache provided to each of the plurality of processor cores based on their respective usage patterns. The cache allocation unit may track cache usage by each of the processor cores/threads using subsets of usage bits and counters configured to update states of the usage bits. The cache allocation circuit may track the usage of cache space by the processor cores/threads and may allocate more space to those that exhibit more usage of the cache.

20 Claims, 7 Drawing Sheets

DYNAMIC MULTITHREADED CACHE ALLOCATION

BACKGROUND

1. Technical Field

This disclosure relates to processors, and more particularly, apparatus and method embodiments for implementing cache allocation policies in a processor.

2. Description of the Related Art

Modern processors often times have a number of processor cores that may share a single cache. For example, while each processor core may have its own level one (L1) cache, a group of processor cores may share a level two (L2) cache. Threads executing on these multiple cores may access the shared cache. Since multiple cores executing multiple threads may be sharing the same cache, there may be competition for some of the cache resources.

In some processors, cache resources may be statically allocated. That is, each core (or thread executing on the various cores) may be assigned to a fixed amount of cache space (e.g., a fixed number of ways may be reserved for each core) equal to each of the other cores. In some embodiments, operating system software may perform the allocation of ways during operation, and may allocate cache space statically or dynamically. Compiler-based cache allocation may also be used, in which a complier creates a map of for the allocation of cache space for a software program operating in an environment where multiple threads are executing and wherein cache allocation may be changed dynamically.

SUMMARY OF EMBODIMENTS OF THE DISCLOSURE

Apparatus and method embodiments for dynamically allocating cache space in a multi-threaded execution environment are disclosed. In some embodiments, a processor includes a cache shared by each of a plurality of processor cores. The processor further includes a cache allocation circuit configured to dynamically allocate space in the cache provided to each of the plurality of processor cores based on their respective usage patterns.

In some embodiments, a method includes executing, on each of a plurality of processor cores, a corresponding one of plurality of threads and accessing a cache shared by each of the plurality of processor cores during execution of each of the plurality of threads. The method further includes dynamically allocating space in the cache provided to each of the plurality processor cores based on usage patterns by each of the plurality of processor cores, wherein said dynamically allocating is performed by a cache allocation circuit.

BRIEF DESCRIPTION OF THE DRAWINGS

Other aspects of the disclosure will become apparent upon reading the following detailed description and upon reference to the accompanying drawings, which are now described as follows.

Figure 1:
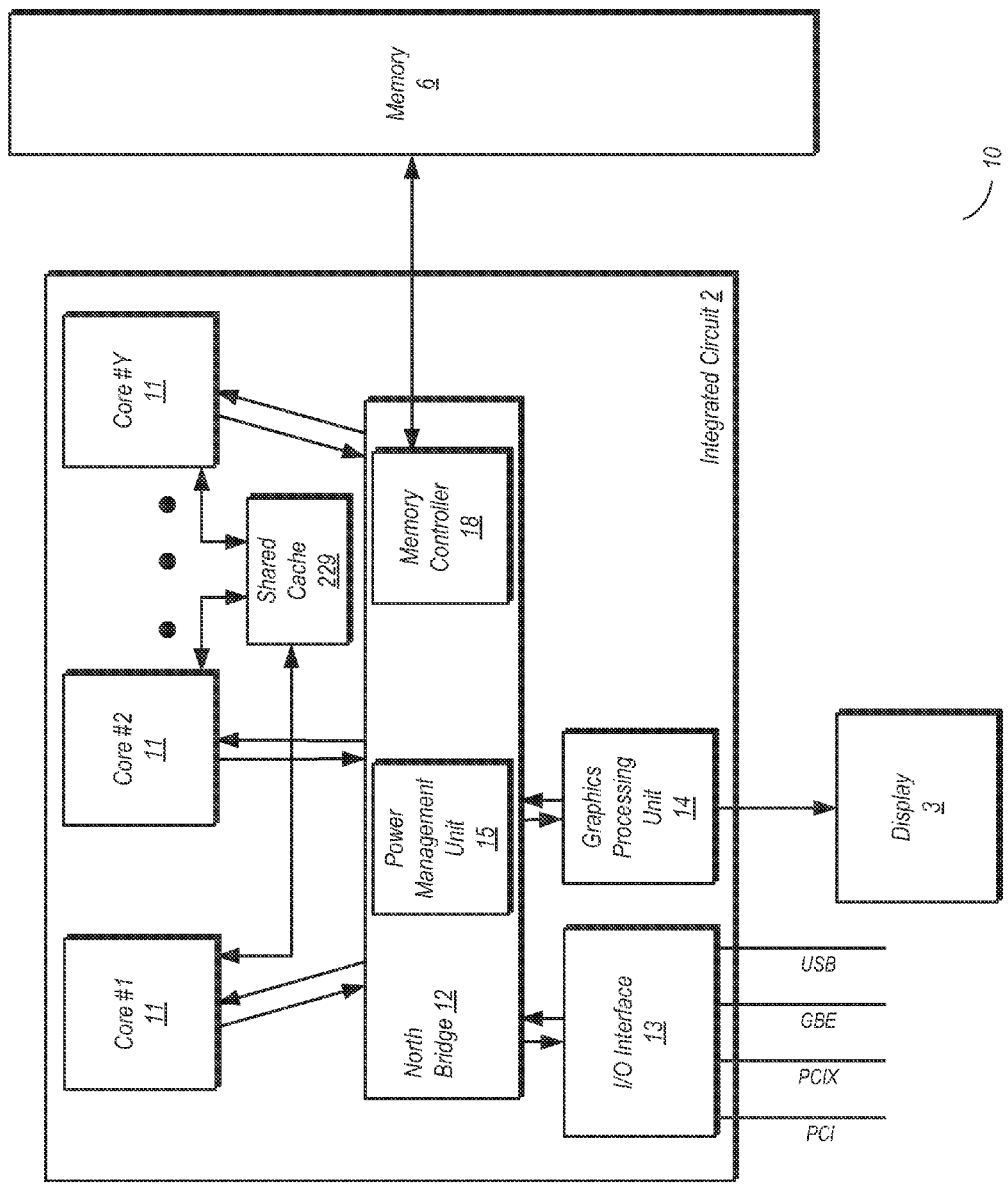
FIG. 1 is a block diagram of a computer system including a processor having multiple cores, in accordance with some embodiments.

While the embodiments are susceptible to various modifications and alternative forms, specific embodiments thereof are shown by way of example in the drawings and will herein be described in detail. It should be understood, however, that the drawings and description thereto are not intended to limit the embodiments to the particular form disclosed, but, on the contrary, the embodiments are to cover all modifications, equivalents, and alternatives falling within the spirit and scope as defined by the appended claims.

DETAILED DESCRIPTION

The present disclosure is directed to dynamic cache allocation in a multi-threaded execution environment. On a computer processor, multiple threads may be executing at a given time. For example, a processor having multiple processor cores may be executing multiple threads at any given time. In another example, a single processor core (such as a superscalar processor core) may execute multiple threads concurrently. Each of the currently executing threads may access a cache memory that is shared by the threads and/or processor cores. A cache allocation circuit may track usage of the cache by each of the threads/cores, and may dynamically update the amount of cache space allocated to each. In general, those threads/cores that exhibit more usage of the cache may be allocated more space therein relative to those that exhibit less cache usage. Note that the terms "processor core" and "core" are used interchangeably in this specification.

In some embodiment, a cache allocation circuit uses counters and usage bits to update and track the usage of the shared cache. The cache may be divided into a plurality of ways and a plurality of indexes. Each of the indexes may include portions of each of the plurality of ways. Each of the indexes may be associated with a number of index bits. Usage bits may be used to track the usage of the cache in a particular index for each of the threads/cores. The state of the usage bits may be updated according to the output of counters each of which corresponds to a particular core/thread. For example, if a processor has four cores, four counters may be provided, while four sets of usage bits may be provided for each of the indexes. Generally, if a particular processor core accesses the cache at a particular index, the cache allocation circuit may increment (or attempt to increment) the count indicated by the usage bits corresponding to that core for that index. In some embodiments, the counters are saturating counters having a maximum count and a minimum count, and thus the usage bits may also saturate at the same maximum and minimum count values. In such embodiments, if the count of a set of usage bits is saturated at its maximum count when a cache access is received, the cache allocation circuit may decrement counts of the usage bits associated with the other cores at that index, if those counts are not already saturated at the minimum count. In some embodiments, a counter updates a usage bit count only when a cache access by its corresponding core in that particular index registers a hit. In some embodiments, an access by a given core in a given index causes the corresponding counter to increment a usage bit count (if not saturated) irrespective of whether the access results in a hit.

In some embodiments, a cache allocation circuit assigns some of the ways of a cache to specific ones of the cores in a multi-core processor, while remaining ways are usable by any of the cores. The cache allocation circuit may also include an allocation decision circuit coupled to each of the counters and to storage locations for each set of usage bits. For a given index, the cache allocation circuit may compare the count values of the usage bits corresponding thereto. Additional ones of the remaining ways in that index may be allocated to cores corresponding to counts having higher values. Moreover, cores whose corresponding counts have higher values (indicating more cache usage) may be allocated more ways in a given index than cores whose corresponding counters have lower count values in that same index.

In one example, a cache may have 16 ways, with four cores sharing the 16 ways. The cache may also have 2000 indexes. For each index, a group of index bits is augmented by two extra bits for each of the cores. Thus, for each index, four two-bit storage locations are provided, one for each of the cores. Consider a situation in which one of the usage bit counts for a given index has a count value at '11', while the remaining counts have a value of '10' or less. The core corresponding to the usage bits with a count value of '11' may be allocated more ways of the cache in that particular index than the cores corresponding to the other usage bits. Furthermore, if the core corresponding to usage bits with a count value of '11' accesses the cache, it may cause all other counts for that index to be decremented if they are not already saturated low at a count of '00'. This in turn may result in even more ways of the cache in that index being allocated to the core corresponding to the usage bits having a count that is saturated high at a at a count value of '11'. If a cache miss occurs during an access by one of the cores associated with a usage bits having a count that is saturated low, a cache line in one of its pre-assigned ways in that index may be chosen to be replaced responsive to the miss, rather than one of the remaining ways that may otherwise be used by any of the cores.

By implementing the dynamic cache allocation apparatus in hardware/circuitry, cache allocation may be performed without operating system intervention or overhead. This in turn may enable a more responsive and efficient allocation of cache resources to processor cores and/or threads executing on processor cores. Moreover, since cache allocation may be more responsive, the more efficient use of cache resources may result in performance improvements.

Numerous variations of the system discussed above are possible and contemplated. Example embodiments are discussed below with reference to FIGS. 1-7.

FIG. 1 is a block diagram of a computer system 10, in accordance with some embodiments. In these embodiments, computer system 10 includes integrated circuit (IC) 2 coupled to memory 6. In some embodiments, IC 2 is a system on a chip (SoC). In some embodiments, IC 2 includes a plurality of processor cores 11. In some embodiments, IC 2 includes one processor core 11. In multi-core embodiments, processor cores 11 may be identical to each other (i.e. symmetrical multi-core), or one or more cores may be different from others (i.e. asymmetric multi-core). Processor cores 11 may each include one or more execution units, cache memories, schedulers, branch prediction circuits, and so forth. Furthermore, each of processor cores 11 may be configured to assert requests for access to memory 6, which may function as main memory for computer system 10. Such requests may include read requests and/or write requests, and may be initially received from a respective processor core 11 by north bridge 12. Requests for access to memory 6 may be initiated responsive to the execution of certain instructions, and may also be initiated responsive to prefetch operations.

I/O interface 13 is also coupled to north bridge 12 in the embodiment shown. I/O interface 13 may function as a south bridge device in computer system 10. A number of different types of peripheral buses may be coupled to I/O interface 13. In this particular example, the bus types include a peripheral component interconnect (PCI) bus, a PCI-Extended (PCI-X), a PCIE (PCI Express) bus, a gigabit Ethernet (GBE) bus, and a universal serial bus (USB). However, these bus types are exemplary, and many other bus types may also be coupled to I/O interface 13. Various types of peripheral devices (not shown here) may be coupled to some or all of the peripheral buses. Such peripheral devices include (but are not limited to) keyboards, mice, printers, scanners, joysticks or other types of game controllers, media recording devices, external storage devices, network interface cards, and so forth. At least some of the peripheral devices that may be coupled to I/O unit 13 via a corresponding peripheral bus may assert memory access requests using direct memory access (DMA). These requests (which may include read and write requests) may be conveyed to north bridge 12 via I/O interface 13.

In some embodiments, IC 2 includes a graphics processing unit (GPU) 14 that is coupled to display 3 of computer system 10. In some embodiments, GPU 14 is an integrated circuit that is separate and distinct from IC 2. In these embodiments, GPU 14 may be coupled to IC 2 via one of the aforementioned busses (e.g., a PCI-E bus). Display 3 may be a flat-panel LCD (liquid crystal display), plasma display, a CRT (cathode ray tube), or any other suitable display type. GPU 14 may perform various video processing functions and provide the processed information to display 3 for output as visual information.

In some embodiments, memory controller 18 is integrated into north bridge 12. In some embodiments, memory controller 18 is separate from north bridge 12. Memory controller 18 may receive memory requests conveyed from north bridge 12. Data accessed from memory 6 responsive to a read request (including prefetches) may be conveyed by memory controller 18 to the requesting agent via north bridge 12. Responsive to a write request, memory controller 18 may receive both the request and the data to be written from the requesting agent via north bridge 12. If multiple memory access requests are pending at a given time, memory controller 18 may arbitrate between these requests.

In some embodiments, memory 6 includes a plurality of memory modules. Each of the memory modules may include one or more memory devices (e.g., memory chips) mounted thereon. In some embodiments, memory 6 includes one or more memory devices mounted on a motherboard or other carrier upon which IC 2 may also be mounted. In some embodiments, at least a portion of memory 6 is implemented on the die of IC 2 itself. Embodiments having a combination of the aforementioned embodiments are also possible and contemplated. Memory 6 may be used to implement a random access memory (RAM) for use with IC 2 during operation. The RAM implemented may be static RAM (SRAM) or dynamic RAM (DRAM). The type of DRAM that may be used to implement memory 6 includes (but are not limited to) double data rate (DDR) DRAM, DDR2 DRAM, DDR3 DRAM, and so forth.

Although not explicitly shown in FIG. 1, IC 2 may also include one or more cache memories that are internal to the processor cores 11. For example, each of the processor cores 11 may include an L1 data cache and an L1 instruction cache. In some embodiments, IC 2 includes a shared cache 229 that is shared by the processor cores 11. In some embodiments, shared cache 229 is an L2 cache. In some embodiments, each of processor cores 11 has an L2 cache implemented therein, and thus shared cache 229 is an L3 cache. In general, the various method and apparatus embodiments described herein may be applicable to a cache of any level that may be shared by multiple threads being executed, whether in a single core or across multiple cores.

Cache 229 may be part of a cache subsystem including a cache controller. The cache controller may include a cache allocation circuit configured to dynamically allocate cache space. As noted above, cache 229 may be shared by the processor cores 11, and further, may be shared by threads executing on processor cores 11. The cache allocation circuit (embodiments of which are discussed in further detail below) may dynamically allocate cache space to processor cores 11 and/or threads executing thereon that exhibit higher cache usage requirements. Since, at times, some processor cores 11 may be inactive (e.g., due to being powered down in a power saving scheme), the cache allocation circuit may dynamically allocate cache space among those processor cores 11 (and threads executing thereon) that remain active.

In some embodiments, north bridge 12 includes a power management unit 15 that is used to monitor and control power consumption among the various functional units of IC 2. More particularly, power management unit 15 may monitor activity levels of each of the other functional units of IC 2, and may perform power management actions is a given functional unit is determined to be idle (e.g., no activity for a certain amount of time). In addition, power management unit 15 may also perform power management actions in the case that an idle functional unit needs to be activated to perform a task. Power management actions may include removing power, gating a clock signal, restoring power, restoring the clock signal, reducing or increasing and operating voltage, and reducing and increasing a frequency of a clock signal. In some cases, power management unit 15 may also re-allocate workloads among the processor cores 11 such that each may remain within thermal design power limits. In general, power management unit 15 may perform any function related to the control and distribution of power to the other functional units of IC 2.

Figure 2:
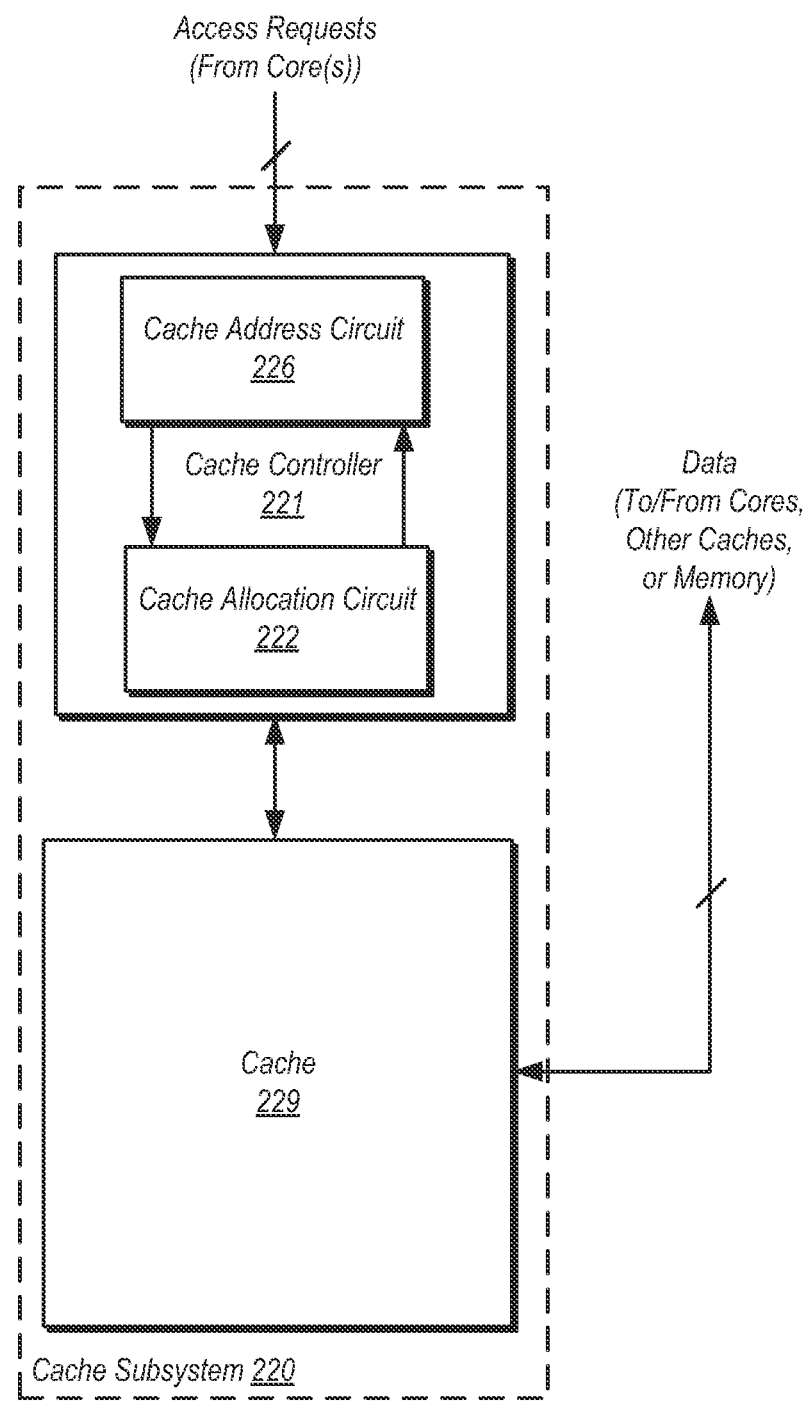
FIG. 2 is a block diagram of a cache subsystem, in accordance with some embodiments.

Turning now to FIG. 2, a block diagram of a cache subsystem, in accordance with some embodiments. As illustrated in FIG. 2, cache subsystem 220 includes a cache controller 221 and cache 229. Cache controller 221 includes a cache address circuit 226 and a cache allocation circuit 222. Cache controller 221 is configured to receive cache access requests from the various ones of the processor cores 11. Responsive to an access request, cache address circuit may conduct a search of cache 229 for the requested information. In some embodiments, cache address circuit 226, responsive to the access request, indicates to cache allocation circuit 222 the core (and/or thread) from which the request was initiated. In some embodiments, cache allocation circuit 222 uses the information received from cache address circuit 226 to track usage of cache 229 by the various cores/thread requesting access, and makes cache allocation decisions based on the tracked usage. In some embodiments, information regarding which cache lines are allocated to specific processor cores/threads is provided to cache address circuit 226. In the event of a cache miss, cache address circuit 226 may use the allocation information received from cache allocation circuit 222 to determine which cache lines are to be replaced. Responsive to determining which addresses are to be replaced, cache address circuit 226 may generate address information to cause the replacement data to be written into cache 229 at the selected address.

In some embodiments, cache 229 is coupled to other portions of a memory hierarchy, including higher level caches within the processor cores (e.g., L1 caches), registers within the processor cores, lower level caches, and main memory. Responsive to a hit (i.e. when requested data is found), cache 229 may provide the data to the requesting processor core, which may place the data in a respective L1 cache as well as in register.

Figure 3:
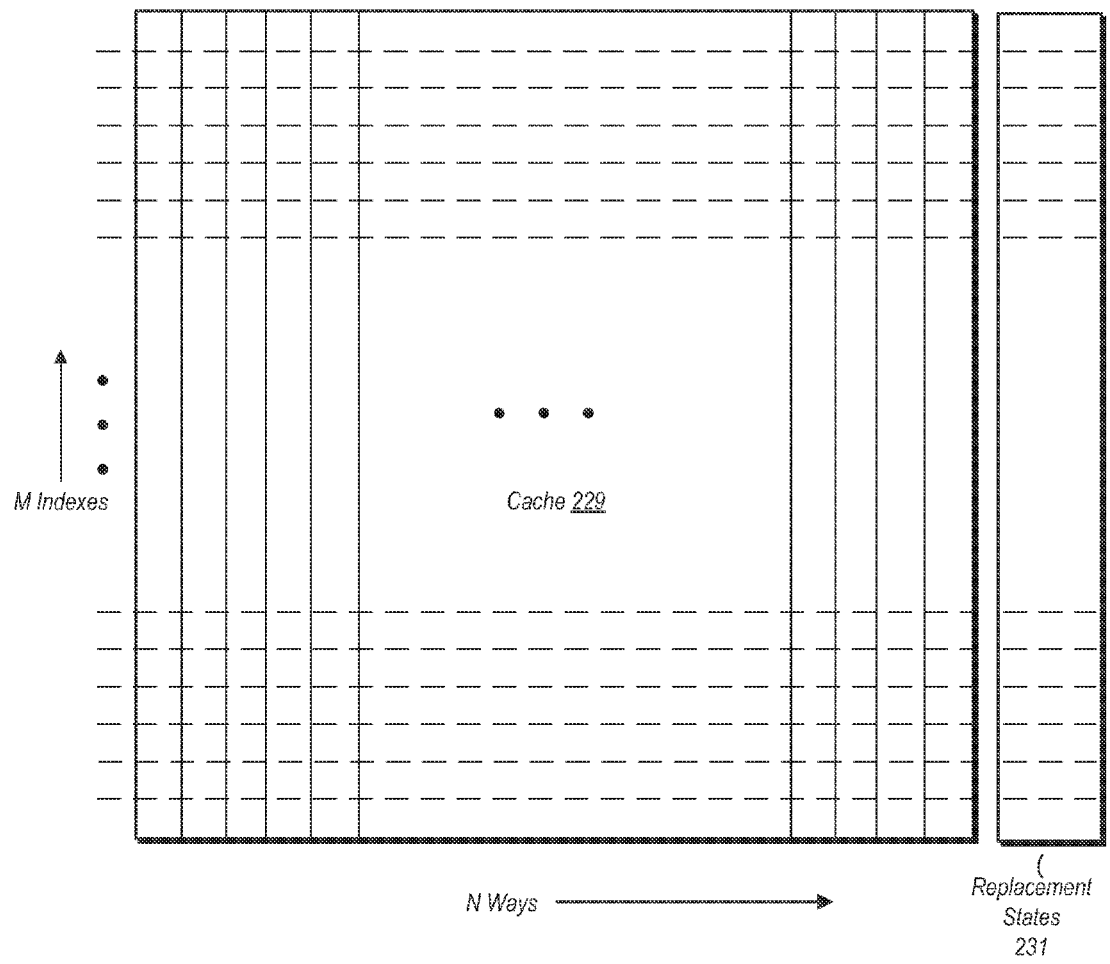
FIG. 3 is a block diagram of a cache, in accordance with some embodiments.

FIG. 3 is a block diagram of one embodiment of cache 229. In the embodiment shown, cache 229 is organized into a plurality of N ways and M indexes. In some embodiments, cache 229 includes 16 ways and 2000 indexes, and thus includes 32000 lines. In some embodiments, cache 229 includes 2000 replacement state fields 231 (e.g., a replacement state field 231 for each index). It is noted however, that these embodiments are not intended to be limiting, and a cache falling within the scope of this disclosure may have any suitable number of ways and any suitable number of indexes.

Addressing a particular location (line) of the cache may be accomplished using an address as shown in FIG. 3. Each address includes a tag, and index, and a block offset. The address may be divided into a block address and a block offset. The block address field may be divided into a tag field and an index field. The block offset field may be used to select desired data from a block (e.g., the way), while the index field may be used to select the set (e.g., the index). The tag may be used to identify the stored data, and may be compared upon an access request to determine if a hit has occurred (i.e. the requested data was found in the cache). The contents at a given storage location in cache 229 include, as shown, a tag, a data field, and a status field (e.g., to indicate if the data is dirty or not).

In some embodiments, each of the replacement state fields 231 is augmented by a number of usage bits. The usage bits may be used to track the usage of the cache by each of the cores/threads that may have access to it at a given time. For each of the cores/threads having access to the cache, a number of usage bits may be provided. In some embodiments, two usage bits may be provided for each of four cores, thereby increasing the total number of index bits by eight. It is noted that the number of usage bits may vary from one embodiment to the next, and thus the example given here is not intended to be limiting. Each of the replacement state fields 231 also includes replacement state algorithm information. Possible replacement state algorithms includes pseudo-least recently used (PLRU) and re-reference interval prediction (RRIP). Other replacement algorithms not discussed herein may also be implemented.

As is explained below, the state of the usage bits may be determined by the output of counters. Based on the states of the various usage bits at any given time, cache allocation circuit 222 may determine an amount of cache space available within each index for each of the cores/threads having access to the cache.

The cache allocation circuit 222 may allocate a number of ways to each of the active cores (or threads) within each index. In some embodiments, the number of ways allocated to a given core/thread is the same for all indexes. In some embodiments, the allocation of ways is performed on a per index basis, and thus a given core/thread may have more ways allocated thereto in one index than in another.

Figure 4:
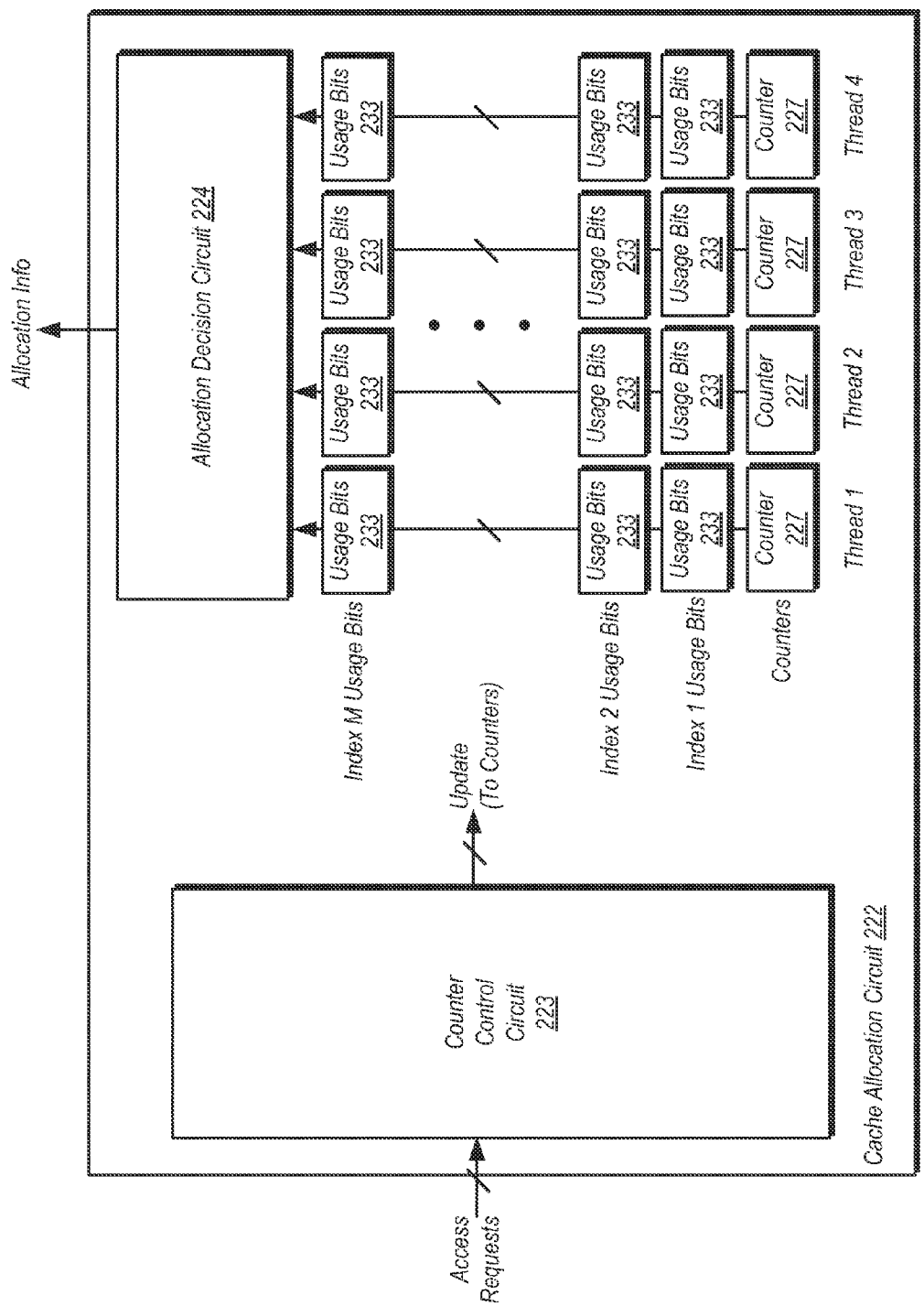
FIG. 4 is a block diagram of a cache allocation circuit, in accordance with some embodiments.

FIG. 4 is a block diagram of a cache allocation circuit, in accordance with some embodiments. As illustrated in FIG. 4, cache allocation circuit 222 includes a counter control circuit 223, an allocation decision circuit, counters 227, and a number of usage bit storage locations 233. The count value output by each counter 227 may be the usage bits described in reference to FIG. 3 that are used to track the usage of the cache at a given index by a particular core or thread. The counters 227 in this embodiment may be saturating counters having a maximum count and a minimum count. Using the example given above, wherein two extra index bits are provided for each of the cores/threads, each of the counters 227 may have a maximum count of binary 11 and a minimum count of binary 00. A higher count value may indicate more cache usage by a given core/thread relative to the other cores/threads. Conversely, a lower count value may indicate less cache usage by a given core/thread relative to other cores/threads. For a given index in associated with a corresponding thread, a counter 227 may update the associated usage bits Counter control circuit 223 in the embodiment shown is coupled to receive cache access requests. Responsive to receiving cache access requests at a given index, counter control circuit 223 may update the usage bits by setting the counters to their current (pre-request value) and subsequently incrementing some counters and possibly decrementing others responsive to the current request. In some cases, various ones of counters 227 may be saturated high or low (and thus cannot be incremented or decremented, respectively). However, cache allocations may nevertheless be updated in such situations.

Responsive to receiving a cache access request originating from a given core or thread executing thereon, counter control circuit 223 may cause a corresponding counter to update usage bits for the requested index if those usage bits do not otherwise correspond to a saturated counter value. In some embodiments, the incrementing of a counter 227 is performed only if a request results in a hit at the requested index. To update a particular set of usage bits for a given thread at a given index, counter control circuit 223 may set the value of a corresponding counter to the value of the usage bits. The counter may then be incremented or decremented as necessary, if not otherwise saturated low or high. After the count value of the counter 227 has been updated, the count value may be written back to the storage location of the usage bits that are to be updated. These usage bits may then be accessed by the allocation decision circuit 224, as explained below.

In some embodiments, if counter control circuit 223 receives an access request and the usage bits 233 corresponding to the requesting core/thread correspond to a counter 227 whose value is saturated high (e.g., binary 11 for the example discussed above), counter control circuit 223 uses the other counters 227 to decrement the values of other usage bits if the values of the usage bits do not otherwise correspond to a counter value that is saturated low. Thus, the usage of the requesting core/thread at that index may nevertheless be indicated as being greater than the usage by the other cores/threads at the same index.

In some embodiments, allocation decision circuit 224 is configured to perform allocations of cache ways at each index for each of the cores/threads. Initially, cache allocation circuit 224 may allocated a set number of ways in each index to each of the cores/threads, while reserving a number of ways in each index as being usable by any of the cores/thread (also referred to as 'open ways'). For example, if the cache includes 16 ways with four cores/threads as requestors, allocation unit 224 may initially reserve two ways in each index for each of the requestors (for a total of eight ways), with the remaining eight ways being designated as usable by any of the requestors.

During operation, cache allocation circuit 223 may dynamically increase or decrease the number of ways per index that are reserved for each of the cores/threads. Allocation decision circuit 224 is coupled to read the respective values from each of the locations of usage bits 233. For each index, allocation decision circuit 224 may compare the values of the usage bits 233 for each index to determine the relative usage of the cache by each of the corresponding cores/threads. Based on the usage bit values relative to one another for a given index, allocation decision circuit 224 may allocate more ways in that index to the cores/threads whose corresponding counters indicate more usage of the cache. For example, if allocation decision circuit 224 determines that one of the cores/threads is accessing the cache at a given index more than the others at that same index, it may allocate additional ways that were initially indicated as usable by any of the open ways.

The number of open ways allocated to the core/thread exhibiting greater usage may depend on its usage relative to the other cores/threads in the same index. In one example, a usage bit value corresponding to one core/thread at a given index may correspond to a counter value that is saturated high (exhibiting high usage in that index), while the usage bit values corresponding to the other cores/threads each correspond to a counter value that is saturated low (exhibiting a relatively lower amount of usage in that index), and thus allocation decision circuit 224 may allocate all or most of the open ways to the core/thread exhibiting high usages. In another example, if two sets of usage bits are neither saturated high or low but one has a greater value than the other while the remaining two sets of usage bits are both saturated low, a majority of the open ways in that index may be allocated to the core/thread associated with the higher count value, while the other core/thread may be allocated a number of open ways that is less than the majority. In a third example, if two sets of usage bits are saturated high while two other sets of usage bits are saturated low, the open ways may be divided evenly among the two cores/thread exhibiting higher usage.

In some embodiments, allocation decision circuit 224 determines replacement policies for cache lines to be evicted. For example, if a particular set of usage bits in a given index is saturated low and an access request by its corresponding core/thread results in a cache miss, data stored in one of its originally allocated cache lines may be selected for eviction rather than evicting data from one of the open ways or allocating additional ways in that index.

In some embodiments, one or more of the cores is powered down, or fewer than the full number of threads are executed at a given time. For example, in a four core processor, one of the cores may be shut down as part of a power saving or thermal design power scheme. In such a case, only three cores may be active, and thus decision allocation circuit 224 may divide the allocation of ways in each index among the three remaining active cores, without reserving any ways for the inactive core. If the inactive core is subsequently re-activated, allocation circuit 224 may update the allocation of ways in each index to reserve at least a minimum number of ways to that core, while updating the allocation of ways to the other cores.

Figure 5:
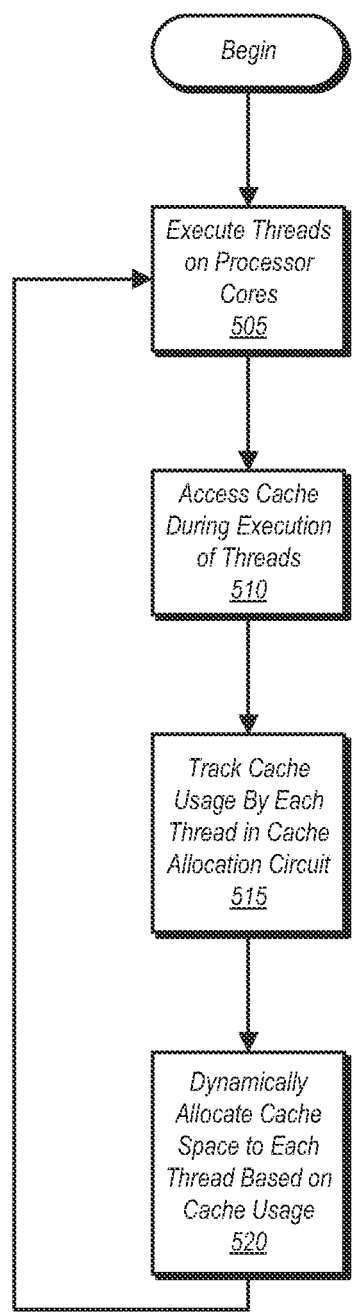
FIG. 5 is a flow diagram illustrating of a method for dynamic cache allocation, in accordance with some embodiments.

Turning now to FIG. 5, a flow diagram illustrating method for dynamic cache allocation, in accordance with some embodiments. Method 500 may be performed by various embodiments of the hardware discussed above, as well as by other hardware embodiment not explicitly discussed herein.

Method 500 begins with the execution of a number of threads on one or more processor cores (block 505). In some embodiments, each processor core executes one thread at a given point in time. Each of the threads, and the cores on which they are executed, may access a shared cache (block 510). A cache allocation circuit may track the usage of the cache by each of the threads executed on the various processor cores (block 515). Moreover, the cache allocation circuit may dynamically allocated cache space to the various threads and cores upon which they are executed based on their exhibited cache usage (block 520). In general, while each thread and corresponding core may be allocated some cache space, those threads/cores exhibiting higher cache usage may have more cache space allocated thereto.

In some embodiments, the dynamic cache allocation is performed on a per index basis. A cache allocation circuit may track the usage of the cache by the various threads/cores within each index through the use of counters or other suitable circuitry. Within each index, the cache allocation circuit may allocate more ways to cores/threads exhibiting the need for more cache space than those needing less cache space.

Figure 6:
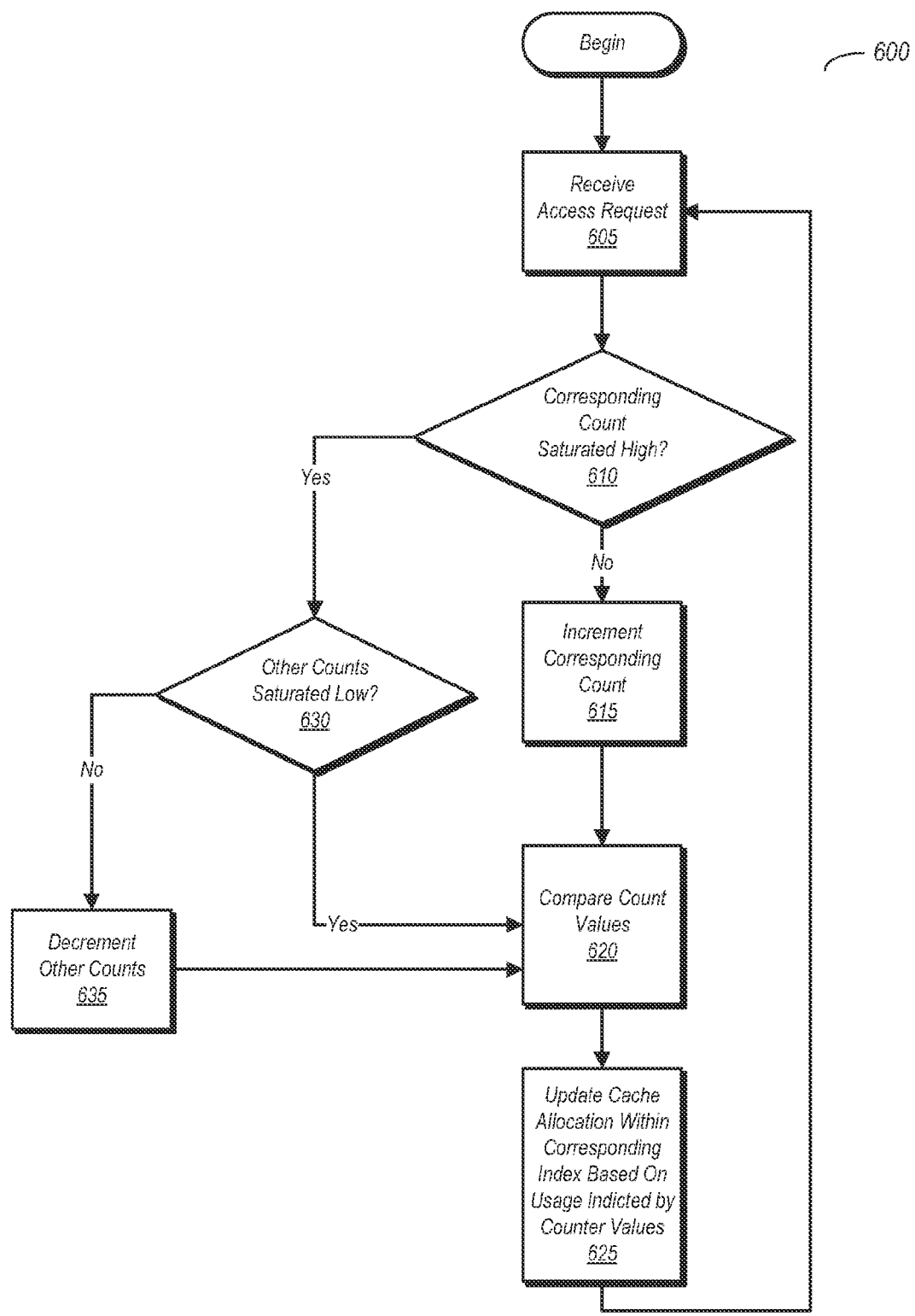
FIG. 6 is a flow diagram illustrating a method for dynamic cache allocation, in accordance with some embodiments.

FIG. 6 is a flow diagram illustrating a method for dynamic cache allocation, in accordance with some embodiments. Method 600 may also be performed by various embodiments of the hardware discussed above, as well as some embodiments not explicitly discussed herein. Moreover, method 600 is directed to embodiments in which saturating counters may be used to track cache usage for each of a number of processor cores and/or threads executing thereon.

Method 600 begins with the receipt of a cache access request (block 605). The access request may originate from a processor core, and more particularly, a thread executing thereon. For the given index to which the request is made, a count value of usage bits corresponding to both the index and the requesting thread/core is checked to determine if it is saturated high (i.e. at its maximum count value). If the count value is not saturated high (block 610, no), the corresponding count is then incremented (block 615). An allocation decision circuit may then compare the value output by the corresponding count to the other count values (corresponding to the other cores) for that index (block 620). After determining the cache usage of the requesting core/thread based on the comparison of count values, the allocation of cache ways within that index may be updated based on the usage indicated by the count values (block 625).

If it is determined that the count value corresponding to the requesting thread/core for that index is saturated high (block 610, yes), then another check is made to determine if any of the other counts are saturated low. If one or more of the other counts are not saturated low (block 630, no), then these counts may be decremented (block 635) prior to a subsequent comparison of counter values (block 620). Otherwise, if all of the remaining counts are saturated low (block 630, yes), then the method may proceed directly to the comparison stage (block 620).

Figure 7:
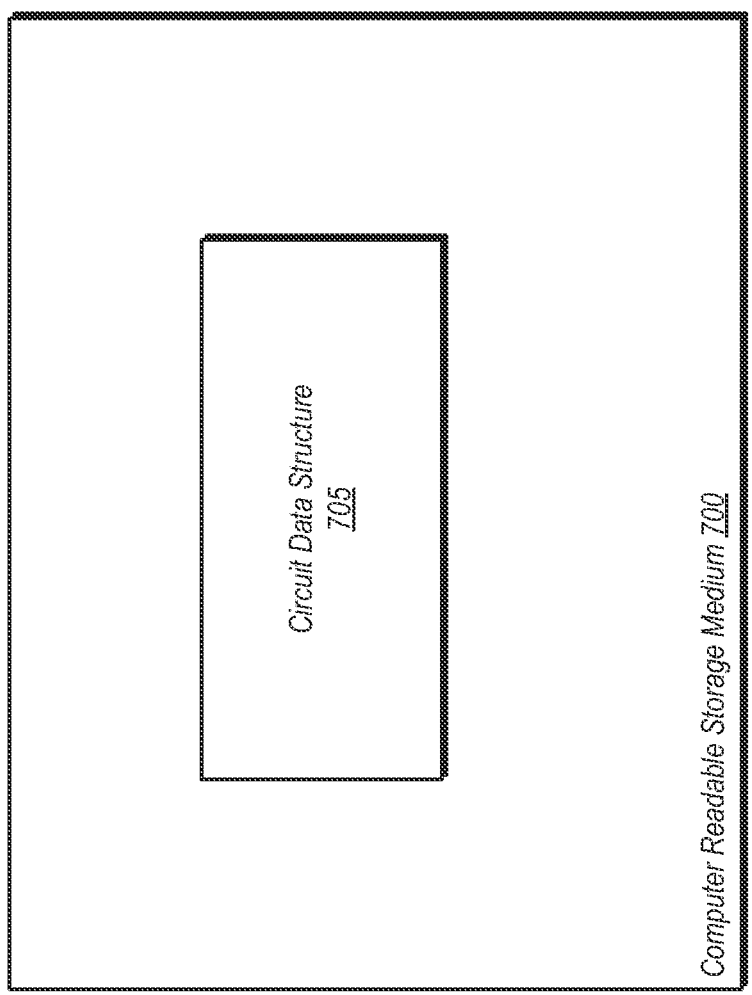
FIG. 7 is a block diagram of a computer readable medium, in accordance with some embodiments.

Turning next to FIG. 7, a block diagram of a computer accessible storage medium 700 including a database 705 representative of the system 10 is shown. Generally speaking, a computer accessible storage medium 700 may include any non-transitory storage media accessible by a computer during use to provide instructions and/or data to the computer. For example, a computer accessible storage medium 800 may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Generally, the data structure 705 representative of the system 10 and/or portions thereof carried on the computer accessible storage medium 700 may be a database or other data structure which can be read by a program and used, directly or indirectly, to fabricate the hardware comprising the system 10. For example, the data structure 705 may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the system 10. The netlist may then be placed and routed to produce a data set describing geometric shapes to be applied to masks. The masks may then be used in various semiconductor fabrication steps to produce a semiconductor circuit or circuits corresponding to the system 10. Alternatively, the database 705 on the computer accessible storage medium 700 may be the netlist (with or without the synthesis library) or the data set, as desired, or Graphic Data System (GDS) II data.

While the computer accessible storage medium 700 carries a representation of the system 10, other embodiments may carry a representation of any portion of the system 10, as desired, including IC 2, any set of agents (e.g., processing cores 11, I/O interface 13, north bridge 12, cache subsystems, etc.) or portions of agents. Furthermore, some of the functions (e.g., method 500, method 600) carried out by the various hardware/circuits discussed above may also be carried out by the execution of software instructions. Accordingly, some embodiments of data structure 705 may include instructions executable by a processor (e.g., IC 2) in a computer system (e.g., computer system 10) to perform the functions/methods discussed above (e.g., method 500, method 600).

Numerous variations and modifications will become apparent to those skilled in the art once the above disclosure is fully appreciated. It is intended that the following claims be interpreted to embrace all such variations and modifications.

What is claimed is:

1. A processor comprising:
a cache shared by a plurality of processor cores; and
a cache allocation circuit configured to dynamically allocate space in the cache provided to each of the plurality of processor cores based on usage patterns for each of the plurality of processor cores;
wherein the cache includes a plurality of indexes each associated with a plurality of usage bits, wherein the plurality of usage bits for each index includes, for each of the plurality of processor cores, a corresponding subset of usage bits indicative of usage of the cache at that index by that processor core;

wherein the cache further includes a plurality of ways in each of the plurality of indexes, wherein the cache allocation circuit is configured to allocate an equal number of ways in each index to each of the plurality of processor cores, and to allocate a predetermined number of ways in each index as being usable by any of the plurality of processor cores; and wherein the cache allocation circuit includes a plurality of counters, wherein each of the plurality of counters corresponds to a unique one of the plurality of processor cores, wherein each of the plurality of counters is configured to, responsive to an access of the cache by its corresponding processor core at a given index, update a value indicated by the subset of usage bits corresponding to that processor core and the given index.

2. The processor as recited in claim 1, wherein each of the plurality of counters is configured to increment a value of its corresponding subset of usage bits at the given index responsive to its respective processor core accessing the cache at the given index.

3. The processor as recited in claim 2, wherein each of the plurality of counters is a saturating counter having a maximum count and a minimum count and wherein each subset of usage bits has a maximum value equal to the maximum count and minimum value equal to the minimum count, and wherein the cache allocation circuit is configured to, responsive to a cache access by a processor core at a given index in which a count of a corresponding subset of usage bits is saturated at its maximum count, decrement a count for each remaining subset of usage bits corresponding to that index.

4. The processor as recited in claim 3, wherein the cache allocation circuit is configured to replace information in a cache line within a given index and allocated to a given processor core responsive to a cache miss within the given index when a count of a subset of usage bits corresponding to the given processor core and given index is saturated at the minimum count.

5. The processor as recited in claim 1, wherein each of the plurality of counters is configured to increment a count of a subset of usage bits responsive to its respective processor core registering a hit during an access of the cache at an index corresponding to the subset of usage bits.

6. The processor as recited in claim 5, wherein each of the plurality of counters is a saturating counter having a maximum count and a minimum count and wherein each subset of usage bits has a maximum value equal to the maximum count and minimum value equal to the minimum count, and wherein the cache allocation circuit is configured to, responsive to a cache access by a processor core registering a hit at a given index in which a count of a corresponding subset of usage bits is saturated at its maximum count, decrement a count for each remaining subset of usage bits corresponding to that index.

7. A method comprising:
executing, on each of a plurality of processor cores, a corresponding one of plurality of threads;
accessing a cache shared by each of the plurality of processor cores during execution of each of the plurality of threads; and
dynamically allocating space in the cache provided to each of the plurality processor cores based on usage patterns by each of the plurality of processor cores;
wherein the cache includes a plurality of indexes each associated with a corresponding plurality of usage bits, and for a given one of the plurality of indexes, indicating usage of the cache by a given one of the plurality of processor cores using a corresponding subset of the plurality of usage bits;

wherein the cache includes a plurality of ways in each of the plurality of indexes, a cache allocation circuit allocating an equal number of ways in each index to each of the plurality of processor cores and the cache allocation unit designating a predetermined number of ways in each index as being usable by any of the plurality of processor cores; and wherein the cache allocation circuit includes a plurality of counters, each corresponding to a unique one of the plurality of processor cores, each of the plurality of counters, responsive to an access of the cache by its corresponding processor core at a given index, updating a value indicated by the subset of usage bits corresponding to that processor core and the given index.

8. The method as recited in claim 7, further comprising the counter incrementing the subset of the plurality of usage bits responsive to the given one of the plurality of processor cores accessing the cache at the given one of the plurality of indexes.

9. The method as recited in claim 8, wherein the counter is a saturating counter having a maximum count and a minimum count and wherein each subset of usage bits has a maximum value equal to the maximum count and a minimum value equal to the minimum count, and wherein the method further comprises decrementing counts for each subset of usage bits associated with each of the other cores responsive to a cache access by the given one of the processor cores when the count of the usage bits at that given index and associated with the given one of the processor cores is saturated at its maximum count.

10. The method as recited in claim 9, further comprising replacing information in a cache line within the given one of the plurality of indexes and allocated to the given one of the plurality of processor cores responsive to a cache miss in that index when the count of the subset of usage bits is saturated at the minimum count.

11. The method as recited in claim 7, further comprising incrementing the count of the subset of usage bits associated with the given one of the plurality of processor cores responsive to the given one of the plurality of processor cores registering a hit during an access of the cache at the given one of the plurality of indexes.

12. The method as recited in claim 11, wherein the counter is a saturating counter having a maximum count and a minimum count and wherein each subset of usage bits has a maximum value equal to the maximum count and a minimum value equal to the minimum count, and wherein the method further comprises decrementing counts for each subset of usage bits at the given index associated with each of the other cores responsive to a cache access by the given one of the processor cores registering a hit when the count of its corresponding subset of usage bits is saturated at its maximum count.

13. The method as recited in claim 7, wherein said dynamically allocating is performed by a cache allocation circuit.

14. A processor comprising:
a cache having a plurality of ways; and
a cache controller circuit configured to dynamically allocate ways in the cache to each of a plurality of threads executing on the processor based on usage of the cache by each of the plurality of threads; and wherein:
the cache further includes a plurality of indexes each associated with a corresponding plurality of usage bits,
the plurality of usage bits is divided into subsets each corresponding to one of the plurality of threads,
each subset of usage bits is indicative of usage of the cache at that index by its corresponding one of the plurality of threads,
the cache controller circuit further comprises a plurality of counters, and
a state of each subset of usage bits is set responsive to an output of one of the plurality of counters.

15. The processor as recited in claim 14, wherein the cache controller circuit is configured to increment a given one of the plurality of counters responsive to a corresponding thread accessing the cache, and wherein the given one of the plurality of counters is configured to update the usage bits at a given index at which the corresponding thread is accessing the cache.

16. The processor as recited in claim 15, wherein the cache controller circuit is configured to increment a given one of the subsets of usage bits responsive to the corresponding thread registering a hit during an access of the cache at the index corresponding to the given one of the subsets of usage bits.

17. The processor as recited in claim 15, wherein each of the plurality of counters is a saturating counter having a maximum count and a minimum count and wherein each subset of usage bits has a maximum value equal to the maximum count and a minimum value equal to the minimum count, and wherein the cache controller is configured to decrement counts for other ones of the subsets of usage bits at responsive to an access of the cache at the given index by a thread corresponding to a given one of the subset of usage bits at the given index that is saturated at its maximum count.

18. The processor as recited in claim 14, wherein the cache controller circuit is configured to allocate a corresponding subset of ways to each of the plurality of threads, and wherein the cache controller circuit is further configured to designate another subset of ways as being usable by any of the plurality of threads.

19. A non-transitory computer readable medium comprising a data structure which is operated upon by a program executable on a computer system, the program operating on the data structure to perform a portion of a process to fabricate an integrated circuit including circuitry described by the data structure, the circuitry described in the data structure including:
a cache shared by each of a plurality of processor cores; and
a cache allocation circuit configured to dynamically allocate space in the cache provided to each of the plurality of processor cores based on usage patterns for each of the plurality of processor cores, wherein the cache includes a plurality of indexes each associated with a plurality of index bits, wherein the plurality of index bits for each index includes, for each of the plurality of processor cores, a corresponding subset of index bits indicative of usage of the cache at that index by that processor core; and
wherein the cache further includes a plurality of ways in each of the plurality of indexes, wherein the cache allocation circuit is configured to allocate an equal number of ways in each index to each of the plurality of processor cores and is further configured to allocate a predetermined number of ways in each index as being usable by any of the plurality of processor cores; and
wherein the cache allocation circuit includes a plurality of counters, wherein each of the plurality of counters corresponds to a unique one of the plurality of processor cores, wherein each of the plurality of counters is configured to, responsive to an access of the cache by its corresponding processor core at a given index, update a value indicated by the subset of usage bits corresponding to that processor core and the given index.

20. The computer readable medium as recited in claim 19, wherein the data structure comprises one or more of the following types of data:
HDL (high-level design language) data;
RTL (register transfer level) data;
Graphic Data System (GDS) II data.

* * * * *